US012383091B2

(12) United States Patent
Nicolini et al.

(10) Patent No.: US 12,383,091 B2
(45) Date of Patent: Aug. 12, 2025

(54) DEVICE ADAPTED TO DELIVER CONSTANT DOSES OF PRODUCTS, IN PARTICULAR FOR BEVERAGE VENDING MACHINES

(71) Applicant: Manea Vending S.R.L., Thiene (IT)

(72) Inventors: Antonio Nicolini, Zanè (IT); Massimo Faravelli, Zanè (IT)

(73) Assignee: Manea Vending S.R.L., Thiene (IT)

( * ) Notice: Subject to any disclaimer, the term of this patent is extended or adjusted under 35 U.S.C. 154(b) by 253 days.

(21) Appl. No.: 18/039,313

(22) PCT Filed: Nov. 26, 2021

(86) PCT No.: PCT/IT2021/050384
§ 371 (c)(1),
(2) Date: May 30, 2023

(87) PCT Pub. No.: WO2022/113144
PCT Pub. Date: Jun. 2, 2022

(65) Prior Publication Data
US 2024/0008676 A1    Jan. 11, 2024

(30) Foreign Application Priority Data
Nov. 30, 2020    (IT) ......................... 102020000029042

(51) Int. Cl.
*A47J 31/40*       (2006.01)
*A47J 31/44*       (2006.01)
*G07F 13/06*       (2006.01)

(52) U.S. Cl.
CPC ......... *A47J 31/404* (2013.01); *A47J 31/4403* (2013.01); *G07F 13/065* (2013.01)

(58) Field of Classification Search
CPC ...... A47J 31/404; A47J 31/4403; A47J 42/50; G07F 13/065; G07F 11/24; G07F 11/44; G01F 11/268
See application file for complete search history.

(56) References Cited

U.S. PATENT DOCUMENTS

| | | | |
|---|---|---|---|
| 2002/0113077 A1* | 8/2002 | Topliffe | G16H 40/67 221/92 |
| 2013/0091802 A1* | 4/2013 | Bentley | A47J 42/50 53/111 R |

(Continued)

FOREIGN PATENT DOCUMENTS

| | | |
|---|---|---|
| EP | 2412281 | 2/2012 |
| EP | 3705004 | 9/2020 |

(Continued)

OTHER PUBLICATIONS

International Preliminary Report on Patentability Dated Sep. 9, 2022 From the International Preliminary Examining Authority Re. Application No. PCT/IT2021/050384. (15 Pages).

(Continued)

*Primary Examiner* — Donnell A Long

(57) ABSTRACT

A device for delivering constant doses of products, comprising one or more containers (1), connected to respective vacuum pumps and inside which products to be selected and dosed are inserted. Each container (1) is mechanically connected to a rotor group (2), which is configured to select and dose the product in constant quantities. In particular, the rotor group (2) comprises an upper casing or shell (4), coupled to a lower casing or shell (5), and a cylindrical rotary selector (6) placed therein; the upper casing (4) has one or more through openings (13) placed at the container discharge hole (1) and the selector (6) is rotated by a motor (18), placed externally to the rotor group (2), by means of a joint (9) placed on the axis of the selector (6). The selector (Continued)

(6) also has a through opening (10), where an insert (11) is housed, adapted to collect a prefixed quantity of product or dose delivered from the container (1).

8 Claims, 9 Drawing Sheets

(56) References Cited

U.S. PATENT DOCUMENTS

| | | | | |
|---|---|---|---|---|
| 2013/0168418 | A1* | 7/2013 | Druyan | A47G 19/2266 222/424.5 |
| 2020/0375388 | A1* | 12/2020 | MacFarlane | G06Q 20/3224 |

FOREIGN PATENT DOCUMENTS

| | | |
|---|---|---|
| IT | MI20121348 | 2/2014 |
| WO | WO 2010/064912 | 6/2010 |
| WO | WO 2012/084964 | 6/2012 |
| WO | WO-2019234647 A1 * | 12/2019 ............. A47J 42/50 |
| WO | WO 2020/165291 | 8/2020 |

OTHER PUBLICATIONS

International Search Report and the Written Opinion Dated Mar. 14, 2022 From the International Searching Authority Re. Application No. PCT/IT2021/050384. (15 Pages).

Rapporto di Ricerca e Opinione Scritta [Search Report and Written Opinion] Dated Aug. 4, 2021 From the Ministero Dello Sviluppo Economico, Direzione Generale Sviluppo Produttivo e Competitivita, Ufficio Italiano Brevetti e Marchi Re. Application No. IT 202000029042. (12 Pages).

* cited by examiner

DEVICE ADAPTED TO DELIVER CONSTANT DOSES OF PRODUCTS, IN PARTICULAR FOR BEVERAGE VENDING MACHINES

RELATED APPLICATIONS

This application is a National Phase of PCT Patent Application No. PCT/IT2021/050384 having International filing date of Nov. 26, 2021, which claims the benefit of priority of Italy Patent Application No. 102020000029042 filed on Nov. 30, 2020. The contents of the above applications are all incorporated by reference as if fully set forth herein in their entirety.

FIELD AND BACKGROUND OF THE INVENTION

This invention generally relates to a device capable of delivering constant doses of products in powder, ground or in grains.

More specifically, the invention relates to a device capable of delivering constant doses of products in powder, ground or in grains while keeping the delivery container vacuum packed so as to preserve its contents and maintain the aromas for longer times than the known art.

The device can be advantageously applied to vending machines of beverages, in particular hot drinks, such as coffee, where a prolonged life of the aroma of the product is required after it has been filled; in this way, the refilling intervals are increased and the quality of the product is maintained.

SUMMARY OF THE INVENTION

In particular, the main objective of this invention is to provide a device adapted to deliver constant doses of products, whether in powder, ground or in grains, which at the same time is capable of maintaining the aroma of the product for prolonged times with respect to the known art.

A further objective of the invention is to provide a device adapted to deliver constant doses of products in powder, ground or in grains, which is easy to make and applicable to vending machines of hot beverages, such as coffee.

Another objective of the invention is to provide a device adapted to deliver constant doses of products in powder, ground or in grains, which allows the product refilling intervals in beverage vending machines to be extended over time with respect to the known art while maintaining the quality of the product itself.

Finally, an objective of the invention is to provide a device adapted to deliver constant doses of products in powder, ground or in grains, which is economically convenient to produce by virtue of the advantages achieved.

These and other aims are achieved by a device adapted to deliver constant doses of products in powder, ground or in grains, in particular for beverage vending machines, according to attached claim 1; further aims and detailed features are contained in the dependent claims.

BRIEF DESCRIPTION OF THE SEVERAL VIEWS OF THE DRAWINGS

This invention will now be described by way of non-limiting example according to some of its preferred embodiments, with the aid of the attached figures, wherein.

DESCRIPTION OF SPECIFIC EMBODIMENTS OF THE INVENTION

Figure 1:
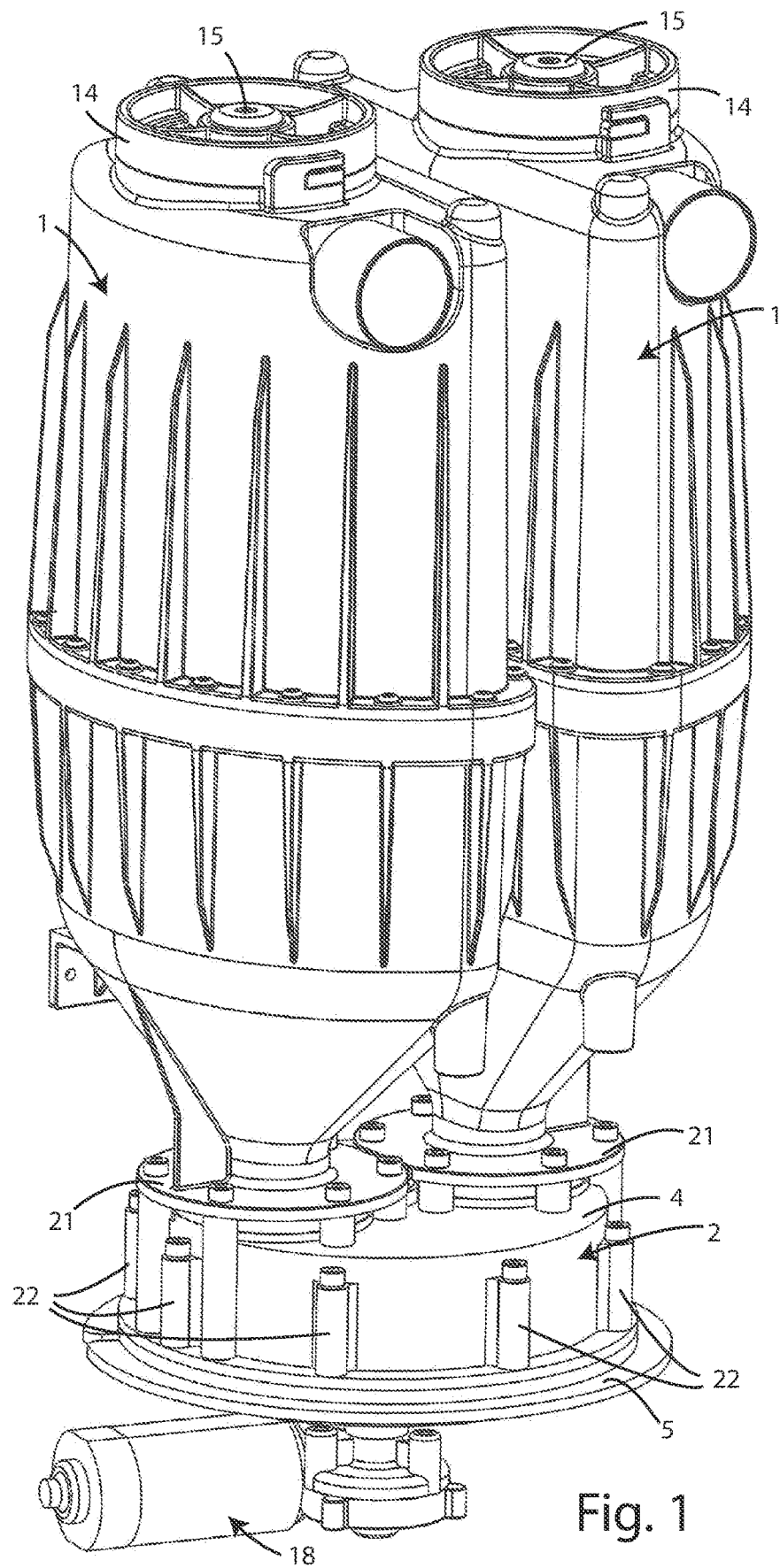
FIG. 1 is an overall perspective view of the device adapted to deliver constant doses of products, in particular for beverage vending machines, according to the invention.
Figure 2:
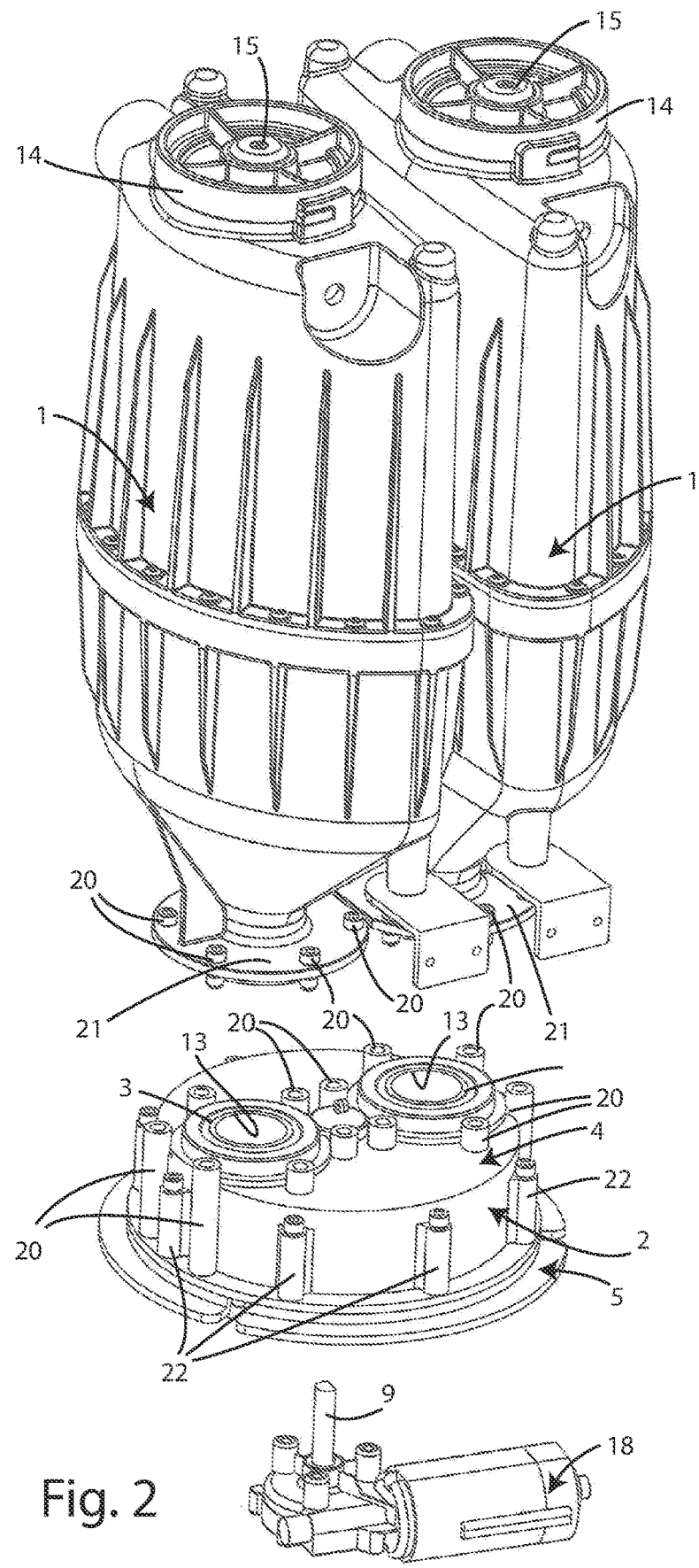
FIG. 2 is an exploded view of the device of FIG. 1, according to the invention.
Figure 3:
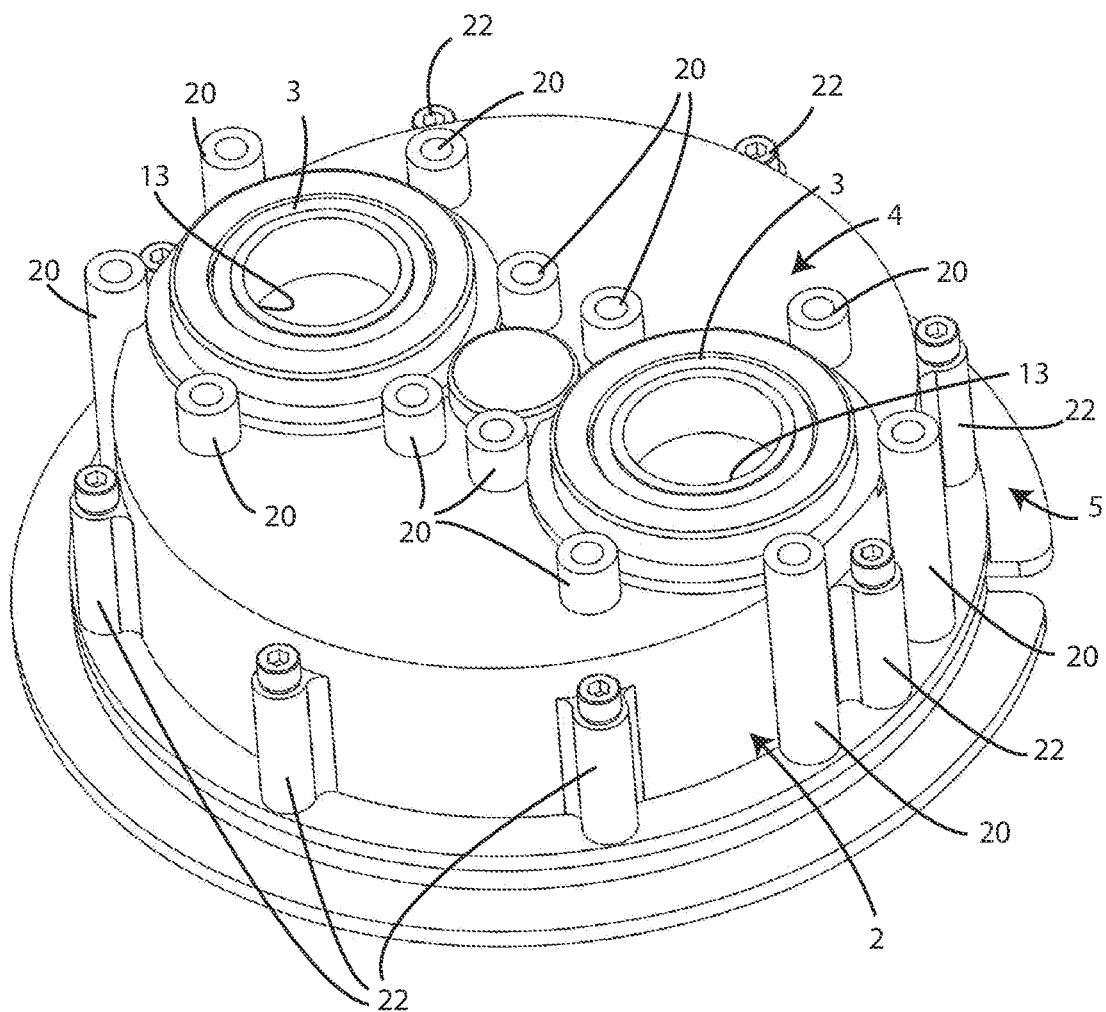
FIG. 3 is an enlarged view of one of the elements that form the delivery device of FIG. 1, according to this invention.
Figure 4:
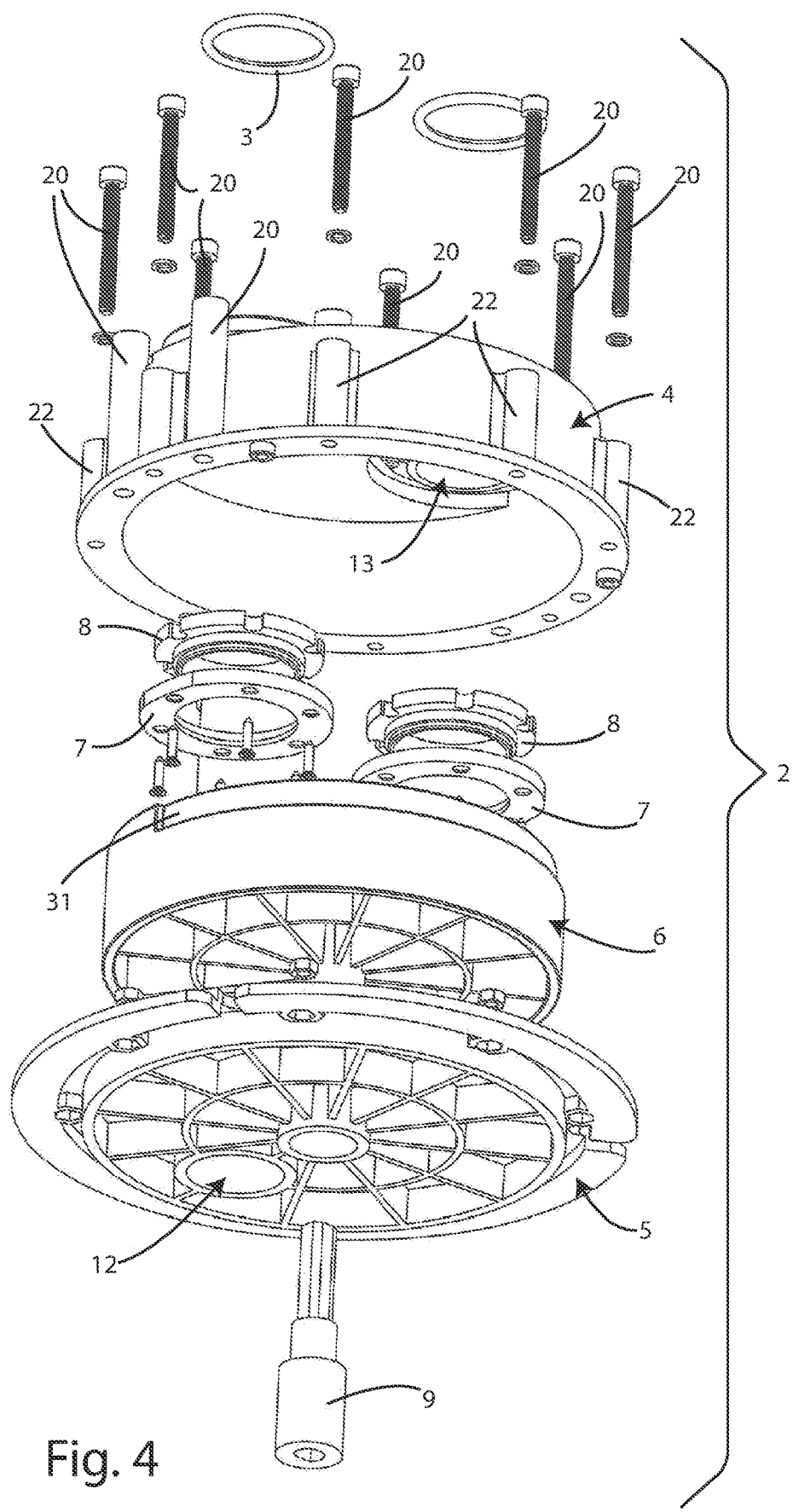
FIGS. 4, 5 and 6 show various exploded views of the element of FIG. 3, according to this invention.
Figure 5:
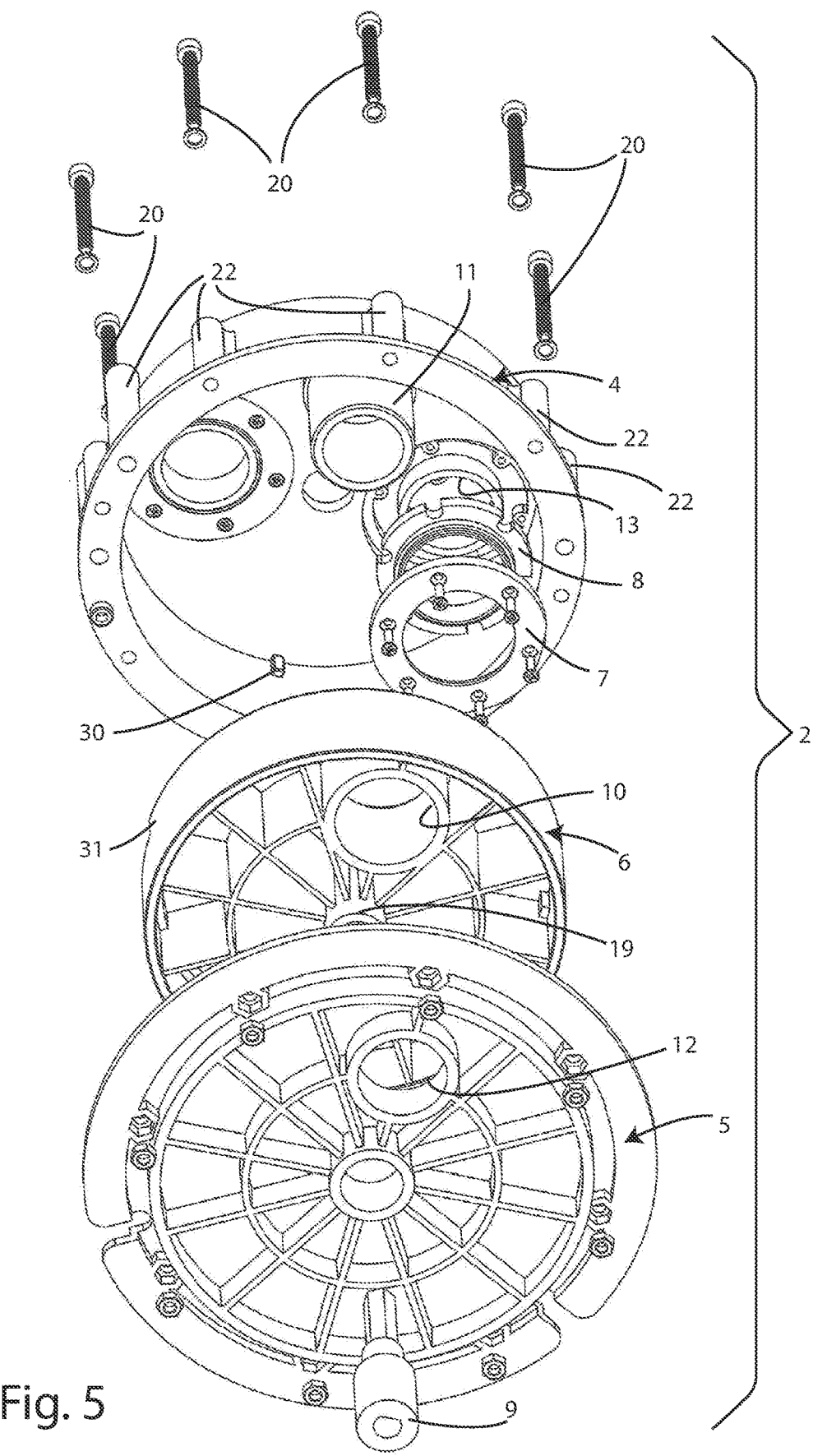
Figure 6:
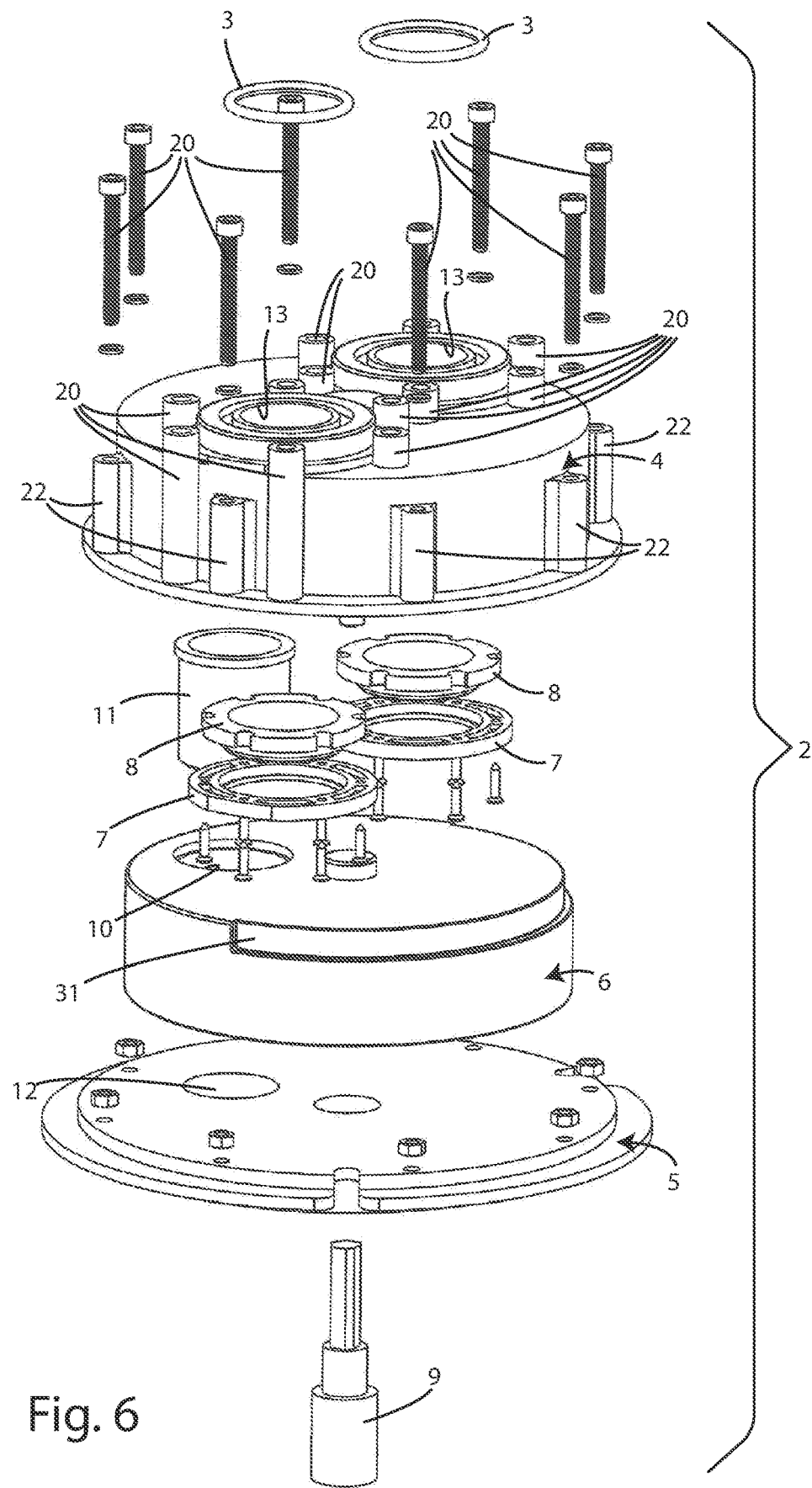

With reference to the aforementioned figures and according to a preferred but non-limiting embodiment, the device for delivering constant doses of products according to the invention allows a mechanical selection of one or more products to be selected and dosed, possibly of different qualities and/or types, which are inserted in respective containers 1, inside which a vacuum is advantageously created through the use of an air vacuum pump system.

The containers or bells 1 are mechanically connected, sealed, by means of base plates 21, fixing means 20 and sealing rings 3, preferably of the O-ring type, to a rotor group 2, which constitutes a mechanism adapted to select and dose the mechanically variable type of products; the sealing rings 3 ensure the seal between each container 1 and the rotor group 2.

As said, the containers 1 are connected to one or more vacuum pumps (not shown in the drawings), which are controlled by one or more maximum and minimum pressure switches.

The products inserted in the containers 1 can be in powder, ground or in grains and in particular, they can for example, consist of ground coffee or coffee in grains.

These products are dosed and selected in constant quantities by means of the delivery device according to this invention.

The sealing of the containers 1 is ensured by sealing systems, preferably of the O-ring type, which connect the various assembly elements of the single container 1.

Furthermore, each container 1 is equipped with an upper filling cap 14 equipped with a discharge valve 15 used to manually obtain the vacuum inside the containers 1.

In the case in which the container 1 contains ground products (such as ground coffee), a selected dose of product is discharged into an infusion system, while in the case in which the container 1 contains products in grains, a grinding group is interposed in order to reduce the grains into powder; however even in the latter case, the delivery device does not require further mechanical dosers, which are generally present in these applications.

Advantageously according to the invention, the rotor group 2 comprises an upper casing or shell 4, which is coupled, by means of fixing means 22, to a lower shell or casing 5, and an internal rotating selector 6; the upper casing 4 and the lower casing 5 form the casing of the rotor 2.

One or more openings 13 are advantageously formed in the upper casing or shell 4, the opening preferably being round in shape and surrounded by sealing rings 3, advantageously of the O-ring type, which are placed at the lower discharge holes of the containers 1 so as to allow the passage of the contained product while keeping the coupling sealed.

Special sealing rings or scraper rings 8 are fixed, by means of respective flanges 7, in the same upper casing or shell 4, inside and on the opposite side with respect to the housing of the sealing rings 3, the sealing rings being placed between the selector 6 and the upper casing 4; the scraper rings 8 are capable of maintaining the seal by sliding on the upper flat part of the selector 6.

An internal cylinder 19 of the selector 6 is connected, outside the rotor group 2, to a motor 18 equipped with a positioner or encoder adapted to regulate the movement of the selector 6; the connection between the cylinder 19 and the motor 18 is obtained by means of a joint 9 positioned on the axis of the selector 6.

Furthermore, a through opening 10 is obtained on the body of the selector 6, which through opening, by means of the rotary movement of the selector 6 (which is driven by the motor 18), can be positioned at the upper openings 13 and along the discharge axis of the containers 1; an insert 11 which collects a prefixed quantity of selectable product delivered from the containers 1 is housed in the opening 10. The quantity of the product to be selected delivered from the containers 1 and the relative weight can be determined from the volume of the insert 11 and from the size of the opening 10.

The actuation of the motor 18 therefore determines the movement of the selector 6 and the consequent positioning of the opening 10 and of the insert 11 below one of the containers 1, from which a predetermined dose of the selected product is discharged through one of the openings 13.

A further opening or through hole 12 for the product to be delivered is made in the lower casing 5, in an offset position with respect to the alignment of the openings 13 and 10, respectively, of the upper casing 4 and the selector 6.

Figure 7A:
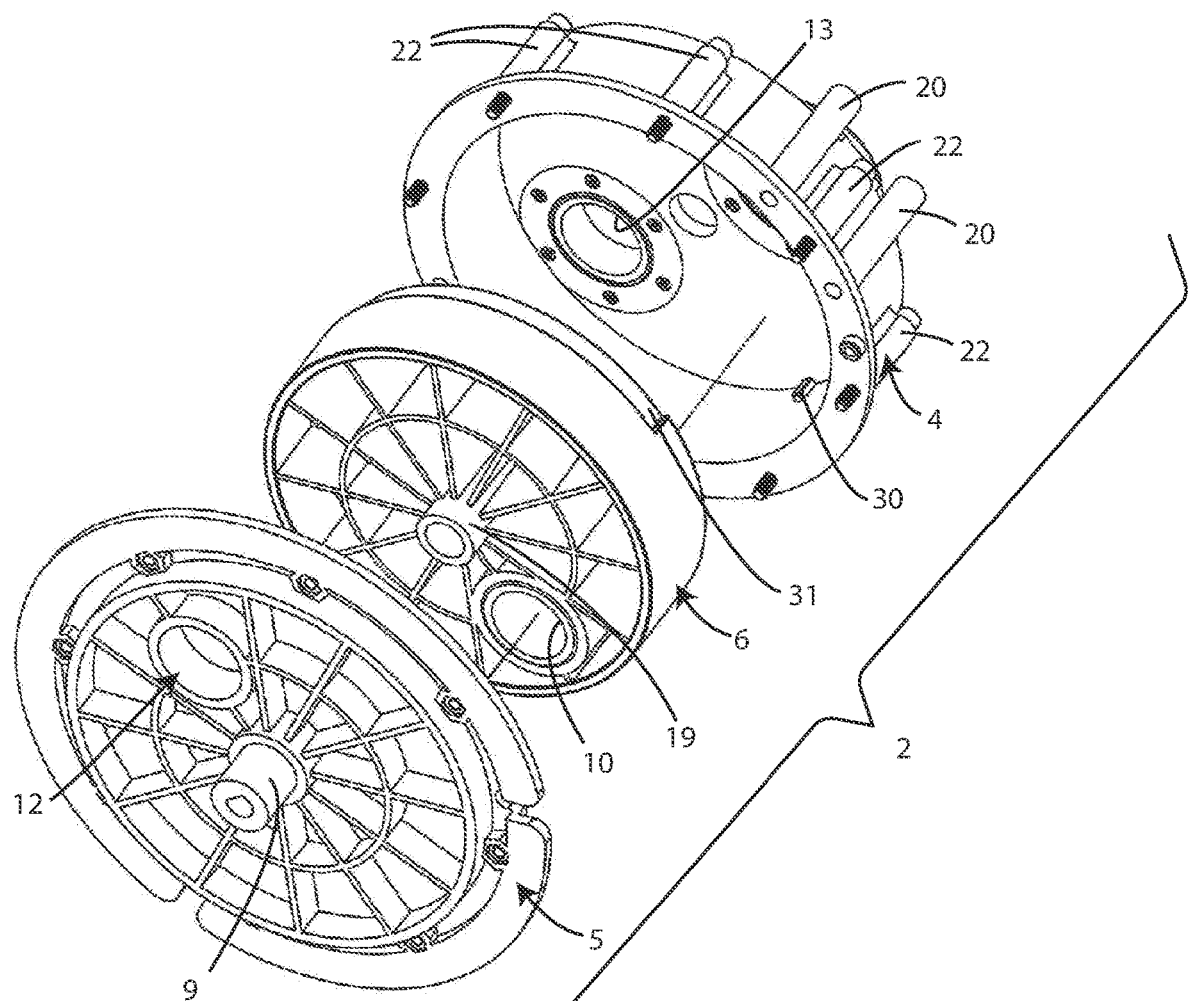
FIGS. 7A, 8A, 9A show a series of exploded views of the element of FIG. 3, according to the invention, in various operating modes.
Figure 7B:
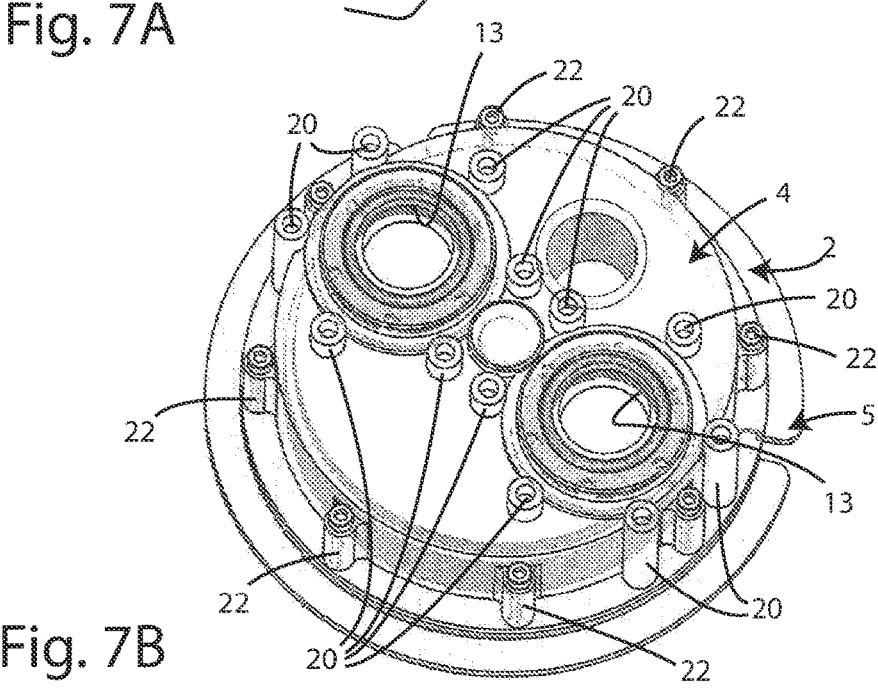
FIGS. 7B, 8B, 9B show top plan views of the element of FIG. 3, according to the invention, in the respective operating modes of FIGS. 7A, 8A, 9A.

The opening 10 and the insert 11 of the selector 6 can be moved by the motor 18 so as to be placed in positions of the rotor group 2 such that they are not aligned with the upper openings 13 so as to maintain the vacuum inside the system comprising the scraper rings 8 and the sealing rings 3 (as shown in detail in attached FIGS. 7A and 7B); the flow of the product delivered from the containers 1 will thus remain blocked at the closed portion of the selector 6, and therefore limited concentrically to the opening 10 by the relative scraper ring 8.

Figure 8A:
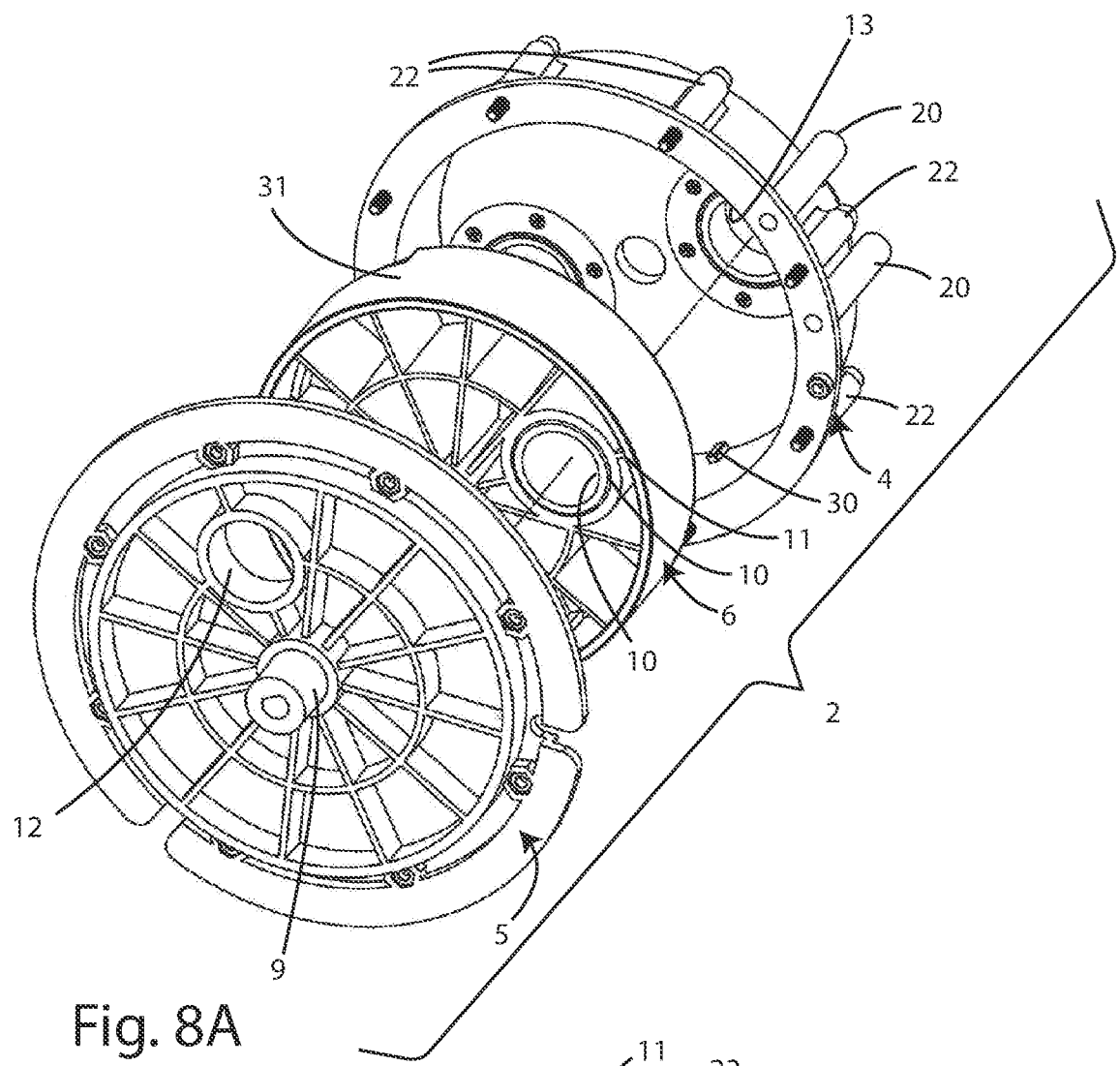
Figure 8B:
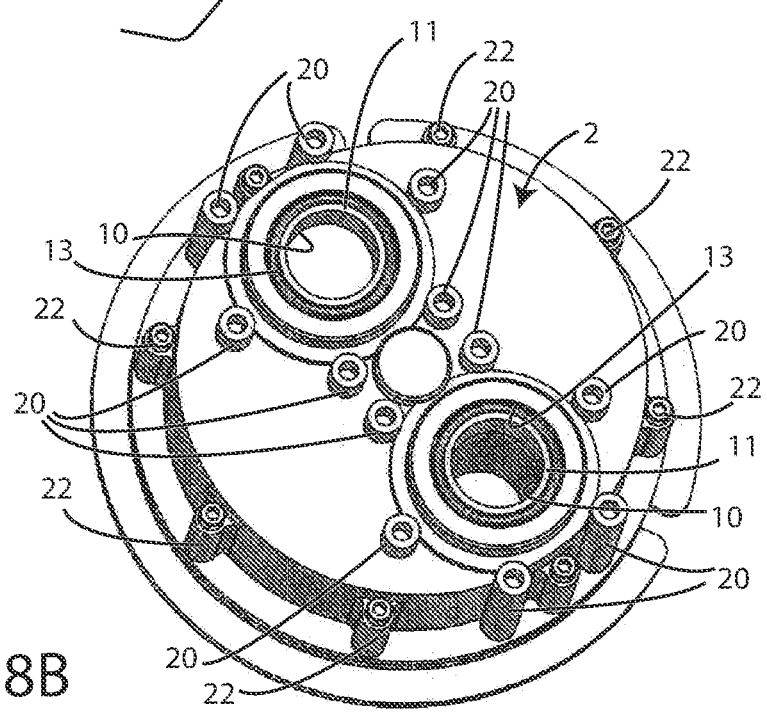

A first movement of the selector 6, by means of the motor 18 and the joint 9, determines the alignment of the openings 13 and 10 at a specific container 1 so as to free the flow of the product and direct it into the insert 11 for an amount equal to the volume of the insert 11 itself (as shown in attached FIGS. 8A and 8B).

Figure 9A:
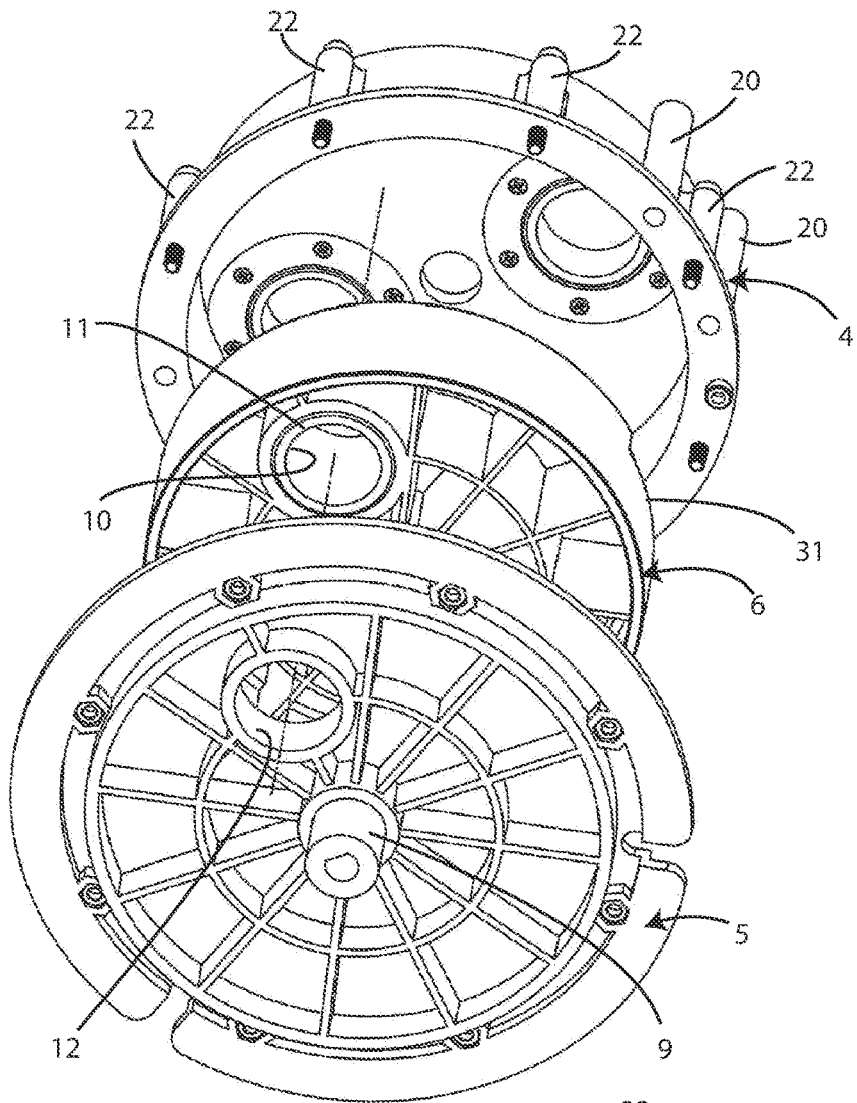
Figure 9B:
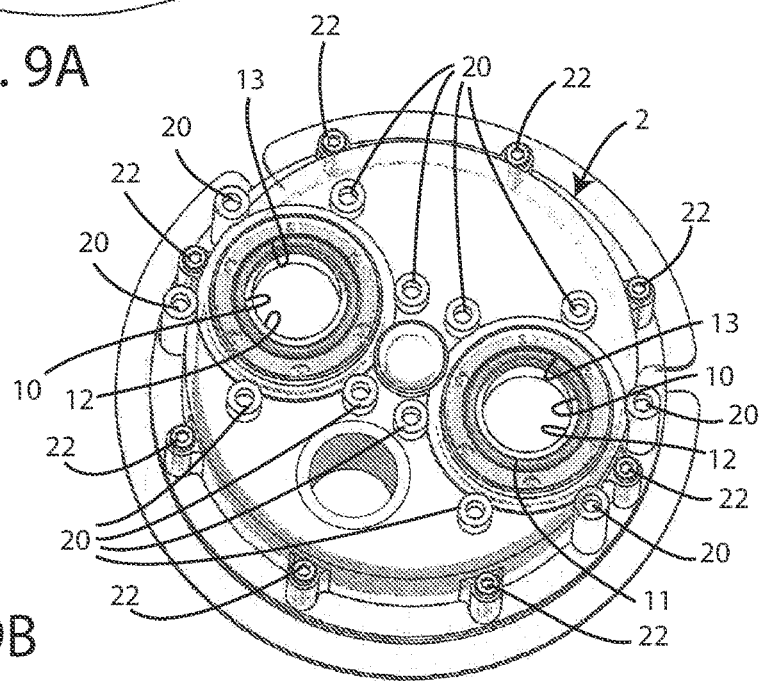

Then, rotating the selector 6 again until the opening 10 that houses the insert 11 is aligned with the delivery opening 12 of the lower casing 5, determines the delivery of the quantity of product present in the insert 11 (as shown in attached FIGS. 9A and 9B).

The sealing and cleaning of the selector 6 are guaranteed by the action of the scraper rings 8.

Once delivery is complete, the selector 6 is moved again to a neutral position (such that the opening 10 is not aligned with the other openings 13, 12) and the vacuum is created again inside the containers 1 by means of the start-up of the air suction pump.

On the other hand, in the movement phase of the selector 6 and in particular, during the phase of aligning the openings 10 and 12 of the selector 6 and of the lower casing 5 and discharging the selected product, the system loses the vacuum, thus allowing the aeration of the product present in the containers 1; this allows the cohesion between the grains due to the oils present in the beans, to be avoided and therefore, also prevents the formation of clogging lumps, especially in the case in which the containers 1 contain coffee beans.

In any case, to obtain a complete vacuum packed seal, it is also possible to insert a further sealing ring, for example an O-ring, on the outer diameter of the selector 6.

Furthermore, the use of different inserts 11 having different thicknesses and different volume of their chamber provides the possibility of adjusting the product doses distributed in different quantities and weights without using other special dosing mechanisms.

Finally, the rotor group 2 advantageously also functions as a shaker in order to break the cohesion forces between any lumps of product that might otherwise stop at the delivery of the containers 1 or inside the path narrowings.

For this purpose, a stop 30 is formed in the internal part of the upper casing 4, which determines the rotation end-of-stroke of the internal selector 6; a groove 31 is obtained on the external surface of the selector 6, the groove being of suitable length and constituting the contrast seat of the stop 30, both for the right-hand rotation and for the left-hand rotation of the selector 6.

It is thus possible to operate the motor 18 so that it brings the selector 6 to the end-of-stroke and therefore, forcing it to move away by a short distance; by repeating this end-of-stroke action several times, it is possible to cause vibrations on the entire rotor group 2 and thus favour the fluidity of the delivered product.

The features of the device for delivering constant doses of products which is the object of this invention, are clear from the above description, as are the relative advantages.

In particular, the device is capable of delivering constant doses of products in powder, ground or in grains while keeping the product container in a controlled vacuum packed condition in order to preserve its contents and maintain the aromas for longer times than the known art.

The delivery device can be applied to vending machines of hot beverages (in particular, coffee) where a prolonged life of the aroma of the product is required after the filling thereof; in this way, it is possible to extend the refill intervals, with respect to the known art, while maintaining the quality of the product.

Lastly, it is clear that this invention has been described by way of example only, without limiting the scope of application, according to its preferred embodiments, but it shall be understood that variations and/or modifications may be made to the invention by experts in the field, without thereby departing from the relative scope of protection of the accompanying claims.

The invention claimed is:

1. Dispensing device for delivering constant doses of products, comprising at least one container (1) inside which at least one product to be selected and to be dosed is inserted, each container (1) being mechanically connected to a rotor group (2), which is configured to select and dose in constant quantities said product, wherein said rotor group (2) comprises an upper casing or shell (4) which is coupled by means of fixing means (22) to a lower casing or shell (5) and a cylindrical rotary selector (6) placed inside said upper (4) and lower (5) casings, said upper casing (4) having one or more first through openings (13) placed in correspondence with respective discharge holes of each container (1) and said selector (6) being rotated by a motor (18), said motor (18) being placed externally to said rotor group (2) and said selector (6) being rotated through a joint (9) placed on the axis of said selector (6), said selector (6) having a second through opening (10) where an insert (11) is housed and said insert (11) being configured to collect a prefixed quantity or dose of product delivered by said container (1), wherein said lower casing (5) has a third through opening (12), which is configured to deliver the product when said third through opening (12) is placed in an offset position with respect to a position of alignment between said one or more first through openings (13) of said upper casing (4) and said second through opening (10) of said selector (6), said container (1) is characterized in that said at least one container (1) is connected to one or more vacuum pumps controlled by one or more pressure switches and characterized in that, when said selector (6) is rotated into a position such that said second through opening (10) is neither aligned with said one or more first through openings (13) nor with said third through opening (12), said one or more vacuum pumps are started in order to create the vacuum inside said at least one container (1).

2. Dispensing device as claimed in claim 1, characterized in that first sealing rings (3) are housed in correspondence with said one or more first through openings (13), while second sealing rings or scraper rings (8) are fixed inside said upper casing (4) and on the opposite side with respect to said first sealing rings (3), said scraper rings (8) being placed between said selector (6) and said upper casing (4) and being able to slide on a flat portion of said selector (6).

3. Dispensing device as claimed in claim 1, characterized in that, when said selector (6) is rotated so that said second through opening (10) and said insert (11) are not aligned with said one or more first through openings (13), the product coming out from said at least one container (1) is blocked in correspondence with a portion of said selector (6) which is delimited by at least one of said scraper rings (8).

4. Dispensing device as claimed in claim 1, characterized in that, when said selector (6) is rotated until said second through opening (10) is aligned with said third through opening (12), said prefixed quantity of product collected in said insert (11) is delivered from said rotor group (2).

5. Dispensing device as claimed in claim 1, characterized in that when said selector (6) is rotated so that said second through opening (10) is aligned with said third through opening (12), the product present inside said at least one container (1) is aerated as said at least one container (1) is not vacuum packed.

6. Dispensing device as claimed in claim 1, characterized in that a further sealing ring is positioned along an external diameter of said selector (6).

7. Dispensing device as claimed in claim 1, characterized in that said at least one container (1) is mechanically connected and sealed, by means of base plates (21), fixing means (20) and said first seal (3), with said rotor group (2).

8. Dispensing device as claimed in claim 1, characterized in that said products present in said at least one container (1) are products in powder, ground or in grains and, in particular, ground coffee or beans of coffee.

\* \* \* \* \*